(12) United States Patent
Jeong et al.

(10) Patent No.: US 8,379,966 B2
(45) Date of Patent: Feb. 19, 2013

(54) APPARATUS AND METHOD FOR RECOGNIZING POSITION OF MOBILE ROBOT

(75) Inventors: Woo-yeon Jeong, Seoul (KR); Jun-ho Park, Hwaseong-si (KR); Seok-won Bang, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1257 days.

(21) Appl. No.: 12/218,058

(22) Filed: Jul. 11, 2008

(65) Prior Publication Data

US 2009/0028387 A1   Jan. 29, 2009

(30) Foreign Application Priority Data

Jul. 24, 2007   (KR) ........................ 10-2007-0074131

(51) Int. Cl.
*G06K 9/00* (2006.01)
*G05B 15/00* (2006.01)
(52) U.S. Cl. ......... 382/153; 700/259; 700/260; 700/261
(58) Field of Classification Search .................. 382/153; 700/259, 260, 261
See application file for complete search history.

(56) References Cited

U.S. PATENT DOCUMENTS

| | | | |
|---|---|---|---|
| 5,051,906 A | | 9/1991 | Evans, Jr. et al. |
| 5,134,435 A | * | 7/1992 | Tsuboi et al. ................. 396/169 |
| 5,793,900 A | * | 8/1998 | Nourbakhsh et al. ......... 382/263 |
| 6,681,150 B1 | * | 1/2004 | Haga et al. .................... 700/245 |
| 7,057,653 B1 | * | 6/2006 | Kubo ............................ 348/273 |
| 2004/0088080 A1 | * | 5/2004 | Song et al. .................... 700/259 |
| 2005/0159841 A1 | * | 7/2005 | Yasukawa et al. ............ 700/245 |
| 2005/0182520 A1 | * | 8/2005 | Takamura et al. ............ 700/259 |

FOREIGN PATENT DOCUMENTS

| | | | |
|---|---|---|---|
| JP | 6-4127 | | 1/1994 |
| JP | 2004021774 A | * | 1/2004 |
| KR | 2003-0026496 | | 4/2003 |
| KR | 2003026496 A | * | 4/2003 |
| KR | 10-2005-0027858 | | 3/2005 |
| KR | 2005027858 A | * | 3/2005 |

* cited by examiner

*Primary Examiner* — Anand Bhatnagar
*Assistant Examiner* — Soo Park
(74) *Attorney, Agent, or Firm* — Staas & Halsey LLP

(57) ABSTRACT

Provided is an apparatus for recognizing the position of a mobile robot. The apparatus includes an image capturing unit which is loaded into a mobile robot and captures an image; an illuminance determining unit which determines illuminance at a position where an image is to be captured; a light-emitting unit which emits light toward the position; a light-emitting control unit which controls the light-emitting unit according to the determined illuminance; a driving control unit which controls the speed of the mobile robot according to the determined illuminance; and a position recognizing unit which recognizes the position of the mobile robot by comparing a pre-stored image to the captured image.

5 Claims, 5 Drawing Sheets

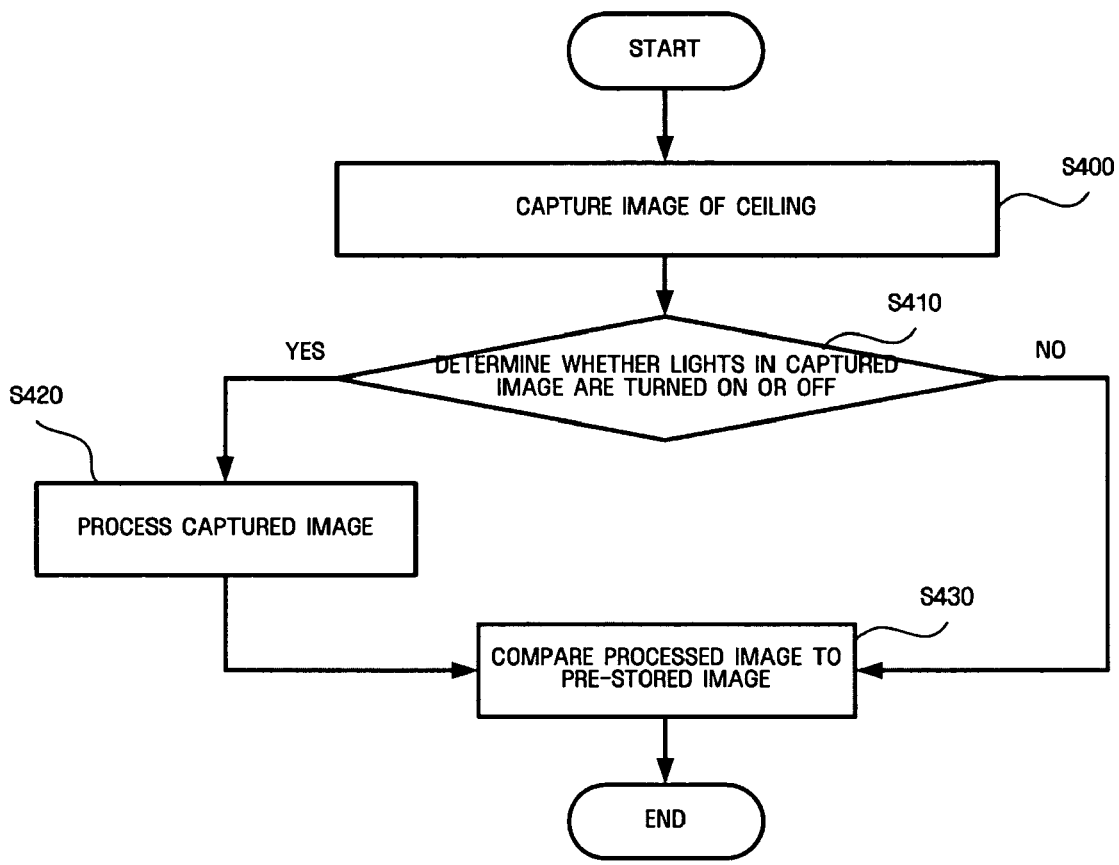

APPARATUS AND METHOD FOR RECOGNIZING POSITION OF MOBILE ROBOT

CROSS-REFERENCE TO RELATED APPLICATIONS

This application claims priority benefit from Korean Patent Application No. 10-2007-0074131 filed on Jul. 24, 2007 in the Korean Intellectual Property Office, the disclosure of which is incorporated herein by reference in its entirety.

BACKGROUND

1. Field

Embodiments relate to an apparatus and method for recognizing the position of a mobile robot, and more particularly, to an apparatus and method for recognizing the position of a mobile robot, in which the lighting of a light-emitting source and the speed of a mobile robot are controlled according to illuminance in order to recognize the position of the mobile robot even at night with lights turned off and in which a captured image determined to have lights turned on is processed so that features of the captured image, which can be changed according to whether lights are turned on or off, remain unchanged regardless of whether the lights are turned on or off in order to enhance the efficiency of recognizing the position of the mobile robot.

2. Description of the Related Art

Mobile robots are used to move or assemble products at industrial sites and to clean the house and move objects at home. In order for mobile robots to be used at industrial sites and at home, it is very important for the mobile robots to be able to accurately recognize their positions and directions.

Self-position recognition technology is divided into relative self-position recognition technology and absolute self-position recognition technology. According to the relative self-position recognition technology, a mobile robot recognizes its relative position using an odometer such as an encoder, and a distance measurer that uses an ultrasonic sensor or a laser. According to the absolute self-position recognition technology, a mobile robot recognizes its absolute position by detecting the position of an artificial mark, which is attached to a predetermined place in a room, or the position of a natural object.

Specifically, when using the relative self-position recognition technology, a mobile robot can build an environmental map on its own and autonomously travel based on the environmental map even if no information about an environment in which the mobile robot is to travel is given in advance. However, as the traveling time of the mobile robot increases, errors of position recognition by an encoder, i.e., an odometer, may accumulate due to a slip phenomenon. In particular, these position recognition errors are increased by collisions or avoiding motions. In addition, when a user artificially changes the position of the mobile robot, the mobile robot may not be able to recognize its position.

In this regard, research is being conducted on the absolute self-position recognition technology which enables a mobile robot to estimate its position using given information about an environmental map and feature information of its surroundings even when the mobile robot cannot recognize its position.

The absolute self-position recognition technology compares features of an image of a mark on a ceiling, which was captured by an imaging device, to those of a pre-stored image of the mark in order to recognize the position of a mobile robot. However, when illuminance of a room is low, it is difficult to capture images of the mark. In addition, if a captured image of the ceiling includes lights, pixel values and sizes of the lights are recognized significantly different when the lights are on and off, thereby causing errors in recognizing the position of the mobile robot.

SUMMARY

Aspects of embodiments provide an apparatus and method for recognizing the position of a mobile robot, in which the lighting of a light-emitting source and the speed of a mobile robot are controlled according to illuminance in order to capture a clear image even at night without lights and thus better recognize the position of the mobile robot.

Aspects of embodiments also provide an apparatus and method for recognizing the position of a mobile robot, in which a captured image determined to have lights turned on is processed so that features of the captured image, which can be changed according to whether lights are turned on or off, remain unchanged regardless of whether the lights are turned on or off in order to enhance the efficiency of recognizing the position of the mobile robot.

However, aspects of embodiments are not restricted to the ones set forth herein. The above and other aspects of embodiments will become more apparent to one of ordinary skill in the art to which the embodiments pertain by referencing the detailed description of embodiments.

According to an aspect of an embodiment, there is provided an apparatus for recognizing the position of a mobile robot. The apparatus includes an image capturing unit which is loaded into a mobile robot and captures an image; an illuminance determining unit which determines illuminance at a position where an image is to be captured; a light-emitting unit which emits light toward the position; a light-emitting control unit which controls the light-emitting unit according to the determined illuminance; a driving control unit which controls the speed of the mobile robot according to the determined illuminance; and a position recognizing unit which recognizes the position of the mobile robot by comparing a pre-stored image to the captured image.

According to another aspect of an embodiment, there is provided an apparatus for recognizing the position of a mobile robot. The apparatus includes an image capturing unit which is loaded into a mobile robot and captures an image; a light on/off determining unit which determines whether a light in the captured image is turned on; an image processing unit which processes the captured image when it is determined that the light in the captured image is turned on; and a position recognizing unit which recognizes the position of the mobile robot by comparing the captured image or the processed image to a pre-stored image.

According to another aspect of an embodiment, there is provided a method of recognizing the position of a mobile robot. The method includes (a) capturing an image using an image capturing unit which is loaded into a mobile robot; (b) determining whether a light in the captured image is turned on; (c) processing the captured image when it is determined that the light in the captured image is turned on; and (d) recognizing the position of the mobile robot by comparing the captured image or the processed image to a pre-stored image.

BRIEF DESCRIPTION OF THE DRAWINGS

These and/or other aspects, features, and advantages will become apparent and more readily appreciated from the following description of exemplary embodiments, taken in conjunction with the accompanying drawings of which:

FIG. 5 is a flowchart illustrating a method of recognizing the position of a mobile robot by processing a captured image when lights in the captured image are turned on or turned off according to an exemplary embodiment.

DETAILED DESCRIPTION OF EMBODIMENTS

Figure 1:
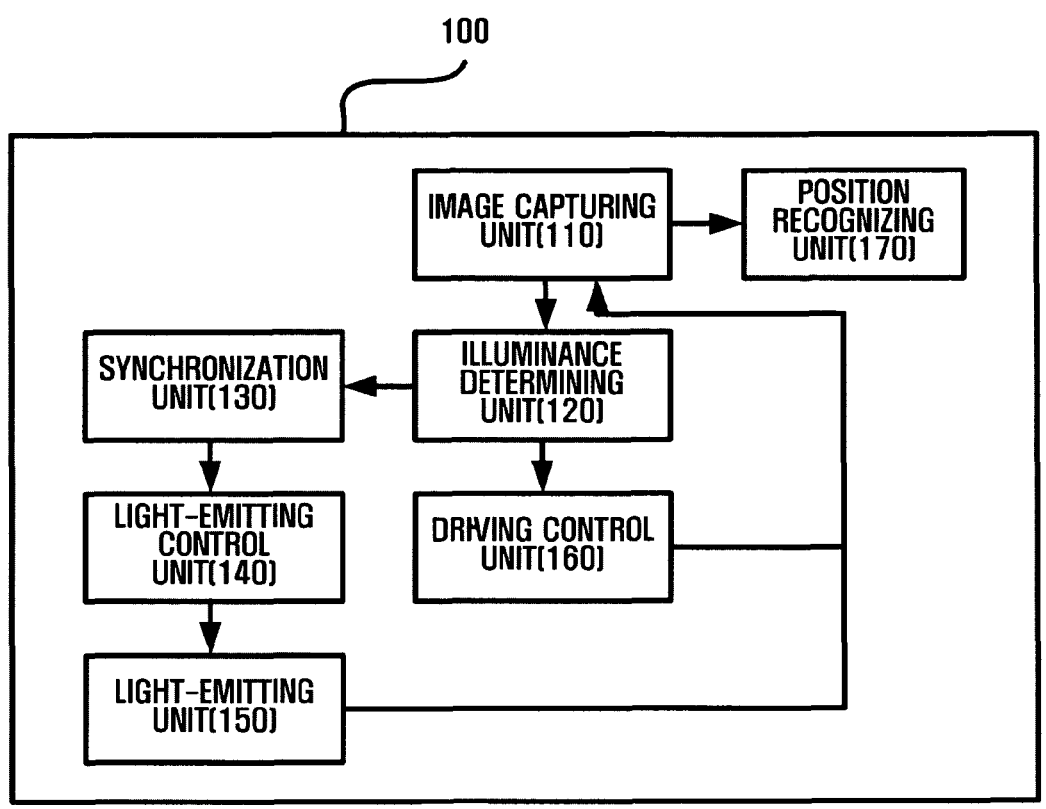
FIG. 1 is a block diagram of an apparatus for recognizing the position of a mobile robot according to an exemplary embodiment, wherein the lighting of a light-emitting unit, the speed of a mobile robot, and the exposure time of a shutter of an image capturing unit are controlled according to illuminance.

Reference will now be made in detail to exemplary embodiments, examples of which are illustrated in the accompanying drawings, wherein like reference numerals refer to the like elements throughout. Exemplary embodiments are described below by referring to the figures.

Exemplary embodiments will hereinafter be described with reference to block diagrams or flowcharts. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, implement the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps (operations) for implementing the functions specified in the flowchart block or blocks.

Figure 2:
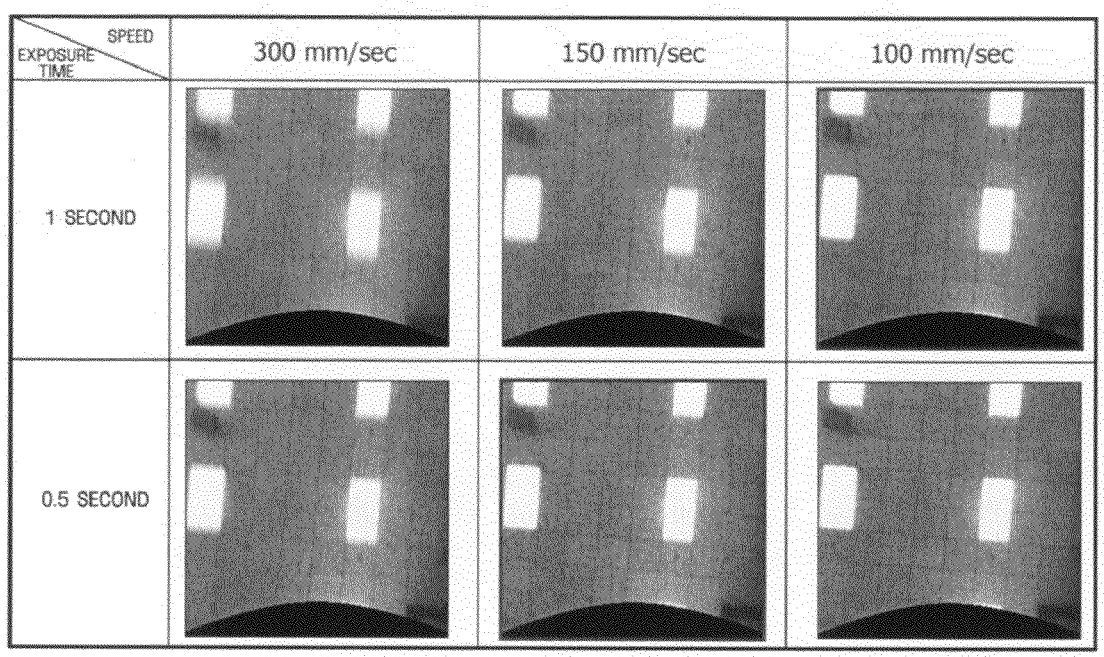
FIG. 2 shows images captured by varying the speed of a mobile robot and the exposure times of a shutter.

FIG. 1 is a block diagram of an apparatus 100 for recognizing the position of a mobile robot according to an exemplary embodiment, wherein the lighting of a light-emitting unit 150, the speed of a mobile robot, and the exposure time of a shutter of an image capturing unit 110 are controlled according to illuminance. FIG. 2 shows images captured by varying the speed of a mobile robot and the exposure times of a shutter.

The apparatus 100 according to the present exemplary embodiment includes the image capturing unit 110, an illuminance determining unit 120, the light-emitting unit 150, a light-emitting control unit 140, a driving control unit 160, and a position recognizing unit 170.

The image capturing unit 110 obtains images from an imaging apparatus such as a digital camera which includes an image pickup device. The image capturing unit 110 may capture images of marks on a ceiling (for example, marks artificially attached to the ceiling for position recognition, a pattern of the ceiling, or the shape of lights on the ceiling). However, the present exemplary embodiment is not limited thereto. The image capturing unit 110 may capture images of structures on, for example, a wall to recognize the position of the mobile robot. The image capturing unit 110 is loaded into the mobile robot and captures images as the mobile robot moves.

The illuminance determining unit 120 determines illuminance at a position where an image is to be captured. To measure illuminance, a separate illuminometer (not shown) may be implemented in the mobile robot or a separate apparatus. However, in the present exemplary embodiment, illuminance may be determined based on an image captured by the image capturing unit 110. Specifically, the mean of values, which indicate brightness of pixels of a captured image, is calculated. Then, illuminance at a position where an image is to be captured is determined based on the calculated mean. Various methods other than the above-mentioned method may be used to determine the illuminance at the position where an image is to be captured.

According to illuminance determined by the illuminance determining unit 120, the light-emitting control unit 140, which will be described later, controls the lighting of the light-emitting unit 150, and the driving control unit 160 controls the speed of the mobile robot.

The light-emitting unit 150 emits light toward a position at which the image capturing unit 110 captures an image. When the illuminance determining unit 120 determines that luminance at a position where an image is to be captured is low, the light-emitting control unit 140 turns on the light-emitting unit 150. Thus, images can be captured even at night. The light-emitting unit 150 may include an infrared light-emitting diode (LED) or an LED bulb. However, the light-emitting unit 150 may include various light sources other than the above examples as long as images can be captured when illuminance is low.

The light-emitting control unit 140 controls the lighting of the light-emitting unit 150 based on the determination result of the illuminance determining unit 120. When the illuminance determining unit 120 determines that illuminance at a position where an image is to be captured is low, the light-emitting control unit 140 controls the light-emitting unit 150 to be turned on when the image capturing unit 110 actually captures an image. Therefore, images can be captured even at night since the light-emitting unit 150 is turned on.

The driving control unit 160 controls the speed of the mobile robot based on the determination result of the illuminance determining unit 120. Here, the driving control unit 160 controls motors of wheels that move the mobile robot. When the illuminance determining unit 120 determines that illuminance at a position where an image is to be captured is low, the driving control unit 160 reduces the speed of the mobile robot when the image capturing unit 110 actually captures an image. On the contrary, when the illuminance determining unit 120 determines that the illuminance is relatively high, the driving control unit 160 increases the speed of the mobile robot when the image capturing unit 110 actually captures an image. Here, the driving control unit 160 may also reduce the speed of the mobile robot when the image capturing unit 110 captures an image.

In order to capture a clear image, the exposure time of a shutter in a camera must be longer when illuminance is low than when illuminance is high. However, if the mobile robot moves fast when an image is captured, image blurring may occur due to the movement of the mobile robot during the long exposure time of the shutter. Therefore, when illuminance is low, the driving control unit 160 must reduce the speed of the mobile robot to prevent image blurring.

FIG. 2 shows images of a ceiling which were captured by varying the exposure time of a shutter and the speed of a mobile robot with a built-in camera when lights on the ceiling were turned on. Referring to FIG. 2, image blurring is reduced as the speed of the mobile robot is reduced from 300 mm/sec to 150 mm/sec and 100 mm/sec while the exposure time of the shutter is fixed. Undoubtedly, a clearer image may be captured if the speed of the mobile robot is reduced even when illuminance is high. However, when illuminance is high, images can be captured even while the mobile robot is moving at a relatively higher speed than when illuminance is low.

The position recognizing unit 170 recognizes a current position of the mobile robot by comparing an image pre-stored in the image capturing unit 110 to an image captured by the image capturing unit 110 at the current position of the mobile robot. The position recognizing unit 170 extracts features to be used for position recognition from an image of a ceiling. The features may include feature points, lines, sides or pixel values extracted from the image to recognize the position of the mobile robot. The features may be extracted based on marks artificially attached to the ceiling for position recognition, a pattern of the ceiling, or the shape of lights on the ceiling. The position recognizing unit 170 also extracts features required to recognize the position of the mobile robot from a pre-stored image of the ceiling. Then, the position recognizing unit 170 recognizes the current position of the mobile robot by comparing the features extracted from the two images. Recognizing the position of a mobile robot by comparing features is a well-known conventional technology, and various relevant methods have been suggested. Thus, a detailed description of the conventional technology will be omitted.

A synchronization unit 130 synchronizes a period of time during which the light-emitting unit 150 is turned on by the control unit 140 with a period of time during which the shutter of the image capturing unit 110 is exposed to capture an image. The light-emitting unit 150 instantaneously emits bright light and brightens the ceiling. If the light-emitting unit 150 continuously emits light, it may be damaged, or its lifespan may be shortened. Therefore, in the present exemplary embodiment, the light-emitting unit 150 is turned on only while the shutter of the image capturing unit 110 is exposed to capture an image.

In summary, in the apparatus 100 according to the present exemplary embodiment, when the illuminance determining unit 120 determines that illuminance at a position where an image is to be captured is low based on an image captured by an image capturing unit 110, the light-emitting unit 150 is controlled by the light-emitting control unit 140 to emit light toward the position to increase the illuminance. Also, the exposure time of the shutter of the image capturing unit 110 is increased while the speed of the mobile robot is reduced by the driving control unit 160 in order to decrease the blurring of an image that is captured. Furthermore, the synchronization unit 130 synchronizes the exposure time of the shutter with the lighting time of the light-emitting unit 150, so that the light-emitting unit 150 is turned on only while the shutter is exposed to capture an image. In addition, the position recognizing unit 170 recognizes a current position of the mobile robot by comparing an image pre-stored in the image capturing unit 110 to an image captured by the image capturing unit 110 at the current position of the mobile robot.

Hereinafter, an apparatus for recognizing the position of a mobile robot according to another exemplary embodiment will be described. The apparatus processes features of an image, which can be changed according to whether lights are turned on or off, to remain unchanged regardless of whether the lights are turned on or off, thereby enhancing the efficiency of recognizing the position of a mobile robot.

Figure 3:
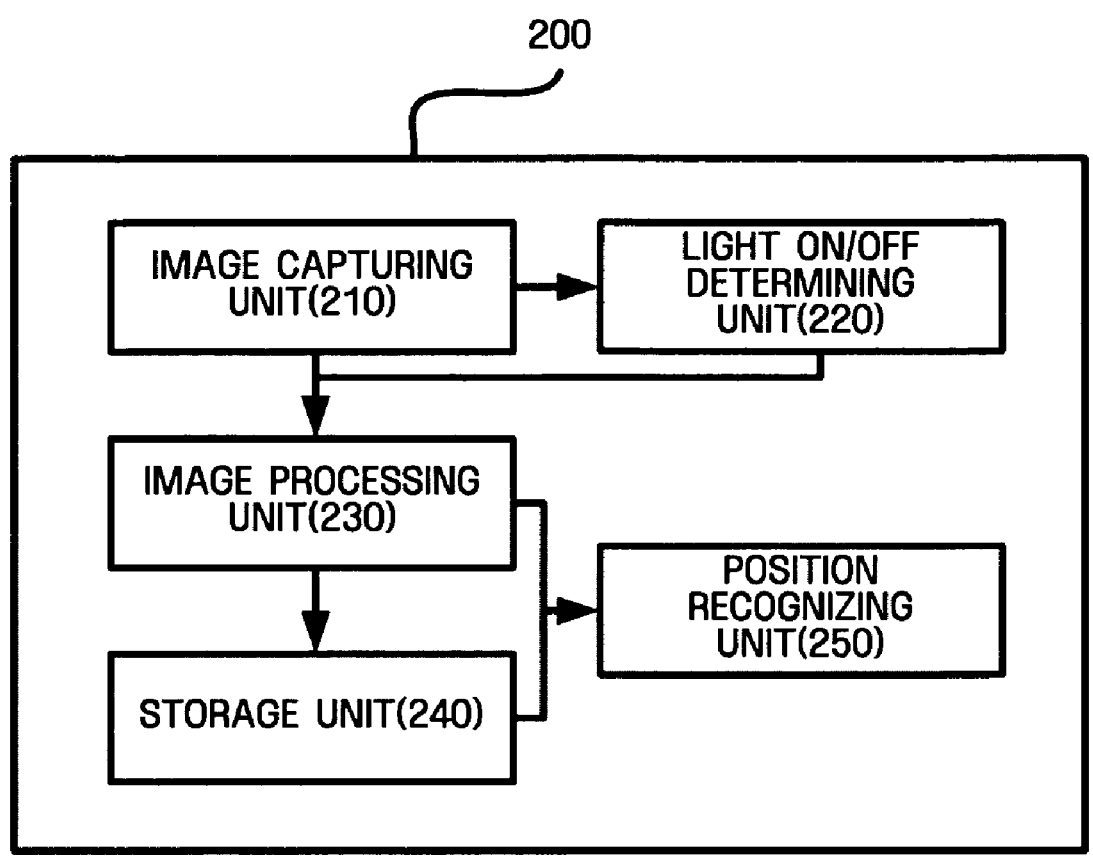
FIG. 3 is a block diagram of an apparatus for recognizing the position of a mobile robot by processing a captured image when lights in the captured image are turned on or turned off according to another exemplary embodiment.
Figure 4:
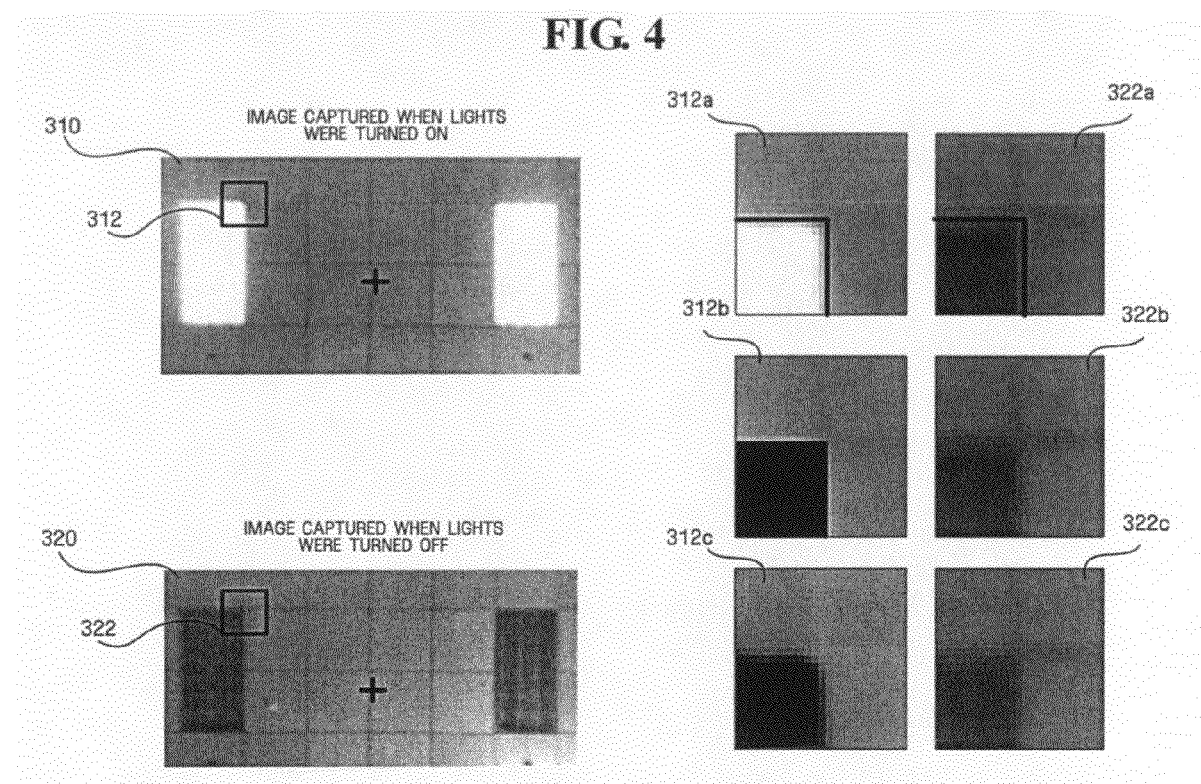
FIG. 4 is a view for explaining methods of processing a captured image when lights in the captured image are turned on or turned off according to an exemplary embodiment.

FIG. 3 is a block diagram of an apparatus 200 for recognizing the position of a mobile robot by processing a captured image when lights in the captured image are turned on or turned off according to another exemplary embodiment. FIG. 4 is a view for explaining methods of processing a captured image when lights in the captured image are turned on or turned off according to exemplary embodiments.

Referring to FIG. 3, the apparatus 200 includes an image capturing unit 210, a light on/off determining unit 220, an image processing unit 230, a storage unit 240, and a position recognizing unit 250.

Since the image capturing unit 210 and the position recognizing unit 250 are identical to the image capturing unit 110 and the position recognizing unit 170 of the previous exemplary embodiment described above, a detailed description thereof will be omitted. Therefore, only the light on/off determining unit 220 and the image processing unit 230 will be described below.

The light on/off determining unit 220 determines whether lights in an image captured by the image capturing unit 210 are turned on. In this case, the light on/off determining unit 220 does not determine whether lights in a room are turned on when an image is captured. Instead, the light on/off determining unit 220 determines whether, when lights are included in a captured image, the lights are turned on. For example, if pixels having brightness values of 250 or higher from among pixels having brightness values of 0 to 255 occupy more than 10 percent of a portion cropped from a captured image, the light on/off determining unit 220 may determine that lights in the captured image are on. However, this is just one example of determining whether lights included in a captured image are on, and various methods can also be used.

When the light on/off determining unit 220 determines that lights in a captured image are on, the image processing unit 230 processes the captured image. FIG. 4 shows an image 310 of a position on a ceiling, which was captured at night by a black-and-white camera when lights on the ceiling were turned on, and an image 320 of the position on the ceiling which was captured when the lights on the ceiling were turned off. Referring to FIG. 4, in the image 310 captured when the lights were on, the lights appear white. In the image 320 captured when the lights were off, the lights appear black. Therefore, although the images 310 and 320 were captured for the same position on the ceiling when the lights on the ceiling were turned on and off, respectively, they may be recognized as images captured for different positions. As a result, the position of a mobile robot may be wrongly recognized. Hence, in the present exemplary embodiment, lights in a captured image, which are turned on, are recognized as the same features as the lights, which are turned off, and the captured image is processed accordingly to detect the position of a mobile robot.

Methods of cropping portions 312 and 322, which include a light, from the images 310 and 320, respectively, on the left side of FIG. 4 and processing the cropped portions 312 and 322 according to exemplary embodiments will now be described with reference to the right side of FIG. 4.

Referring to the top of the right side of FIG. 4, there are provided an image 312a having a light turned on and an image 322a having the light turned off. The images 312a and 322a may be processed to extract a boundary line of the light from each of the images 312a and 322a. If the two images 312a and 322a are compared to each other by determining the light portion of each of the images 312a and 322a to represent a black pixel value when the light is off and determining the light portion to represent a white pixel value when the light is on, the same light may be recognized as different features. Consequently, the position of a mobile robot may be wrongly recognized. However, if the light is recognized as the same feature based on the boundary line of the light which is extracted regardless of whether the light is on or off, the errors in recognizing the position of the mobile robot can be reduced.

Another image processing method is shown in the middle of the right side of FIG. 4. In an image 312b, a portion determined to have a light turned on is converted to have a black pixel value so that the image 312b becomes similar to an image 322b having the light turned off. If an image of a ceiling is captured at night when lights are turned off, the lights usually come out black as shown in the image 322b on the right since the ceiling is bright. Thus, if portions determined to be the lights are processed to become black as shown in the image 312b on the left, the lights turned on are recognized as the same features as those turned off, thereby reducing the errors of position recognition.

Another image processing method is shown at the bottom of the right side of FIG. 4. In an image 312c, a portion determined to have a light turned on is converted into a negative image so that the image 312c becomes similar to an image 322c determined to have the light turned off. When lights are turned on, they come out white. When the lights are turned off, they come out black. Thus, if light portions of an image captured when lights were turned on are converted into a negative image, the lights turned on may be determined to be the same features as those turned off, thereby reducing the errors of position recognition.

The position recognizing unit 250 compares an image obtained after a captured image having lights turned on is processed to a pre-stored image stored in storage unit 240 to recognize the position of the mobile robot. If the lights in the captured image are turned off or if no lights are included in the captured image, the position recognizing unit 250 may compare the captured image to the pre-stored image.

Hereinafter, a method of recognizing the position of a mobile robot according to an exemplary embodiment will be described. The method processes features of an image, which can be changed according to whether lights are turned on or off, to remain unchanged regardless of whether the lights are turned on or off, thereby enhancing the efficiency of recognizing the position of a mobile robot.

FIG. 5 is a flowchart illustrating a method of recognizing the position of a mobile robot by processing a captured image when lights in the captured image are turned on or turned off according to an exemplary embodiment.

Referring to FIG. 5, the image capturing unit 210 loaded into a mobile robot captures an image of a ceiling (operation S400). If the captured image includes lights, it is determined whether the lights are turned on or turned off (operation S410). If it is determined that the lights in the captured image are turned on, the captured image is processed (operation S420). Here, the captured image may be processed by extracting boundary lines of the lights, converting light portions of the captured image to become black, or converting the captured image into a negative image as described above. Next, the processed image is compared to a pre-stored image of the ceiling to recognize the position of the mobile robot (operation S430). Here, the pre-stored image may also be processed to extract boundary lines. However, if it is determined that the lights in the captured image are turned off or that no lights are included in the captured image (operation S410), the captured image is not processed, and its features are matched with those of the pre-stored image to recognize the position of the mobile robot (operation S430).

As described above, an apparatus and method for recognizing the position of a mobile robot according to an exemplary embodiment provide at least one of the following advantages.

First, when illuminance is low, a light-emitting unit is turned on, and the speed of a mobile robot is adjusted. Therefore, an image that does not blur can be obtained despite a long exposure time. Consequently, errors in recognizing the position of the mobile robot can be reduced even at night.

Second, when illuminance is low, the lighting time of the light-emitting unit is synchronized with the exposure time of a camera. Therefore, the light-emitting unit can be prevented from being unnecessarily turned on.

Third, when lights are included in a captured image, the captured image is processed appropriately, so that features of the lights when turned on become identical to those of the lights when turned off. Therefore, the efficiency of recognizing the position of the mobile robot can be enhanced.

Although a few exemplary embodiments have been shown and described, it would be appreciated by those skilled in the art that changes may be made in these exemplary embodiments, the scope of which is defined in the claims and their equivalents.

What is claimed is:

1. An apparatus for recognizing a position of a mobile robot, the apparatus comprising:

an image capturing unit which is loaded into the mobile robot and captures an image;

an illuminance determining unit which determines illuminance at the position where the image is to be captured;

a light-emitting unit which emits light toward the position;

a light-emitting control unit which controls the light-emitting unit according to the determined illuminance;

a driving control unit which controls the speed of the mobile robot according to the determined illuminance; and a position recognizing unit which recognizes the position of the mobile robot by comparing a pre-stored image to the captured image, wherein the driving control unit decreases the speed of the mobile robot when the determined illuminance is low to allow for an increase in exposure time of a shutter of the image capturing unit, and wherein the driving control unit increases the speed of the mobile robot when the determined illuminance is high to allow for a decrease in exposure time of the shutter of the image capturing unit.

2. The apparatus of claim 1, wherein the illuminance determining unit determines illuminance based on the image captured by the image capturing unit.

3. The apparatus of claim 1, wherein the light-emitting unit comprises an infrared light emitting diode (LED) or an LED bulb.

4. The apparatus of claim 1, further comprising a synchronization unit which synchronizes a period of time during which the light-emitting unit is turned on by the light-emitting control unit with a period of time during which a shutter of the image capturing unit is exposed to capture the image.

5. The apparatus of claim 1, wherein, if the illuminance determining unit determines that the illuminance is low, the light-emitting control unit turns on the light-emitting unit.

* * * * *